United States Patent
Lee et al.

(10) Patent No.: US 9,787,843 B2
(45) Date of Patent: Oct. 10, 2017

(54) ELECTRONIC DEVICE AND CALL-FORWARDING CONTROL METHOD THEREOF

(71) Applicant: Samsung Electronics Co., Ltd., Gyeonggi-do (KR)

(72) Inventors: Soohyun Lee, Seoul (KR); Seoktae Kim, Seoul (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 14/833,824

(22) Filed: Aug. 24, 2015

(65) Prior Publication Data
US 2016/0057285 A1 Feb. 25, 2016

(30) Foreign Application Priority Data

Aug. 22, 2014 (KR) .................. 10-2014-0109624

(51) Int. Cl.
- H04M 3/42 (2006.01)
- H04M 3/54 (2006.01)
- H04W 4/16 (2009.01)
- H04W 4/00 (2009.01)
- H04W 4/12 (2009.01)

(52) U.S. Cl.
CPC ....... H04M 3/543 (2013.01); H04M 3/42153 (2013.01); H04W 4/008 (2013.01); H04W 4/16 (2013.01); H04M 3/42263 (2013.01); H04M 2203/2094 (2013.01); H04M 2250/04 (2013.01); H04W 4/12 (2013.01)

(58) Field of Classification Search
None
See application file for complete search history.

(56) References Cited

U.S. PATENT DOCUMENTS

| | | | |
|---|---|---|---|
| 6,775,559 B1 | 8/2004 | Weghorst et al. | |
| 8,515,407 B1 | 8/2013 | Mok et al. | |
| 2003/0003900 A1* | 1/2003 | Goss | H04M 3/54 |
| | | | 455/417 |

(Continued)

FOREIGN PATENT DOCUMENTS

| KR | 20010023992 | 3/2001 |
|---|---|---|
| KR | 100626473 | 9/2006 |

(Continued)

OTHER PUBLICATIONS

International Search Report dated Oct. 29, 2015 issued in counterpart application No. PCT/KR2015/008745, 4 pages.

(Continued)

*Primary Examiner* — Moustapha Diaby
(74) *Attorney, Agent, or Firm* — The Farrell Law Firm, P.C.

(57) ABSTRACT

A method and an electronic device for controlling call-forwarding of the electronic device corresponding to first call address information is provided. The electronic device includes transmitting, to at least one of a server or a second electronic device corresponding to second call address information, a call-forwarding request to forward, to the electronic device, at least one of incoming calls or messages addressed to the second call address information of the second electronic device; and providing the at least one of the requested incoming calls or messages addressed to the second call address information.

20 Claims, 8 Drawing Sheets

(56) References Cited

U.S. PATENT DOCUMENTS

| | | | |
|---|---|---|---|
| 2004/0077315 A1 | 4/2004 | Crook | |
| 2006/0258287 A1* | 11/2006 | Bidet | H04L 12/5855 455/41.2 |
| 2008/0207184 A1* | 8/2008 | Wassingbo | H04M 1/7253 455/417 |
| 2010/0246796 A1 | 9/2010 | Sumioka et al. | |
| 2011/0145356 A1 | 6/2011 | Tanner | |
| 2011/0244841 A1* | 10/2011 | Locker | H04M 3/42263 455/417 |
| 2012/0072751 A1* | 3/2012 | Das | H04W 52/0229 713/323 |
| 2014/0045473 A1* | 2/2014 | Salisbury | H04M 3/543 455/417 |

FOREIGN PATENT DOCUMENTS

| | | |
|---|---|---|
| KR | 1020070108683 | 11/2007 |
| KR | 1020110058828 | 6/2011 |
| KR | 1020120032823 | 4/2012 |
| KR | 101305968 | 9/2013 |
| KR | 1020130120213 | 11/2013 |

OTHER PUBLICATIONS

European Search Report dated Jan. 26, 2016 issued in counterpart application No. 15182003.2-1851, 9 pages.

\* cited by examiner

ELECTRONIC DEVICE AND CALL-FORWARDING CONTROL METHOD THEREOF

PRIORITY

This application claims priority under 35 U.S.C. §119(a) to a Korean Patent Application No. 10-2014-0109624 filed in the Korean Intellectual Property Office on Aug. 22, 2014, the entire content of which is incorporated herein by reference.

BACKGROUND OF THE INVENTION

1. Field of the Invention

The present invention relates generally to screen displays, and more particularly, to a method and an electronic device for displaying executed functions on split screens.

2. Description of the Related Art

By using mobile phones, users are able to talk to each other through a telephone function, and may also exchange information with each other through the transmission/reception of text messages. Along with the development of digital technology, electronic devices have also been developed in various forms and with various functions. In recent years, many users have come to use two or more electronic devices according to types of functions performed by each respective device. Such electronic devices may have identifying numbers (e.g. telephone numbers) for identifying them, in order to execute the communication functions of these devices.

In general, in order to forward incoming calls from a first electronic device to a second electronic device, the user of the electronic devices must directly enter the telephone number of the second electronic device into the first electronic device, thereby setting up the call-forwarding. Alternatively, the user may subscribe to a call-forwarding service to a communication service company, thereby forwarding, to a first electronic device, calls incoming to the second electronic device.

When a user goes out (i.e., leaves a particular location) with only some of the user's electronic devices while leaving others behind, the user may not receive/answer calls incoming to the electronic devices that the user has left behind. Therefore, when one of the user's electronic devices that the user isn't carrying receives an important message, he/she may not check it immediately.

SUMMARY OF THE INVENTION

The present invention has been made in order to address at least the above-described problems, and to provide at last the advantages described below.

An aspect of the present invention provides a method for controlling call-forwarding of an electronic device corresponding to first call address information is provided. The method includes transmitting, to at least one of a server or a second electronic device corresponding to second call address information, a call-forwarding request to forward, to the electronic device, at least one of incoming calls or messages addressed to the second call address information of the second electronic device; and providing the at least one of the requested incoming calls or messages addressed to the second call address information.

According to another aspect of the present invention, an electronic device for controlling call-forwarding and corresponding to first call address information is provided. The electronic device includes a communication interface configured to connect to at least one of a server or a second electronic device corresponding to second call address information through a network; a short-range wireless communication interface configured to connect to the second electronic device through short-range wireless communication; a memory configured to store first call address information; a control module configured to control at least one of the communication interface or the short-range wireless communication interface to transmit, to at least one of the server or the second electronic device, a call-forwarding request to forward, to the electronic device, at least one of incoming calls or messages addressed to the second call address information of the second electronic device, and providing the at least one of the requested in combing calls or messages addressed to the second call address information, and an input/output device for displaying the provided at least one of calls or messages.

According to another aspect of the present invention, an electronic device for controlling call-forwarding and corresponding to first call information is provided. The electronic device includes a communication interface configured to connect to a least one of a server or a second electronic device corresponding to second call address information through a network; a short-range wireless communication interface configured to connect to the second electronic device through short-range wireless communication; a memory configured to store the second call address information; and a control module configured to control at least one of the communication interface or the short-range wireless communication interface to receive, from at least one of the server or the second electronic device, a call-forwarding activation signal for activating call-forwarding to the second electronic device and respond to the activation signal, and set up the call-forwarding to the second electronic device.

BRIEF DESCRIPTION OF THE DRAWINGS

The above and other aspects, features, and advantages of certain embodiments of the present invention will become more apparent from the following detailed description, taken in conjunction with the accompanying drawings, in which.

DETAILED DESCRIPTION OF EMBODIMENTS OF THE PRESENT INVENTION

Hereinafter, various embodiments of the present invention will be described in detail with reference to the accompanying drawings. Various modifications, additions and substitutions from the described embodiments of the present invention are possible, and the scope of the present invention is not limited to the following embodiments. The embodiments described herein are provided to assist in understanding the present invention. Embodiments of the present invention may include all modifications and/or equivalents and/or substations included in the idea and technical scope of the described embodiments of present invention. In the drawings, the same or similar elements may be denoted by the same or similar reference numerals in different drawings.

The terms used in this application are for describing particular embodiments only, and are not intended to limit the present invention. As used herein, the singular forms are intended to include the plural forms as well, unless the context clearly indicates otherwise.

Unless defined differently, all terms used herein, which include technical terminologies or scientific terminologies, have the same meanings as understood by a person skilled in the art to which the present invention belongs. Such terms as those defined in a generally used dictionary are to be interpreted to have the same contextual meanings as normally understood in the relevant field of art, and are not to be interpreted to have ideal or excessively formal meanings unless clearly defined in the present specification.

The expressions such as "include" and "may include" which may be used with respect to embodiments of the present invention to denote the presence of functions, operations, and constituent elements, do not limit one or more additional functions, operations, and constituent elements. Herein, terms such as "include" and/or "have" may be construed to denote a certain characteristic, number, step, operation, constituent element, component or a combination thereof, but do not exclude the existence of or a possibility of the addition of one or more other characteristics, numbers, steps, operations, constituent elements, components or combinations thereof.

Furthermore, herein, the expression "and/or" includes any and all combinations of the associated listed words. For example, the expression "A and/or B" includes A, may include B, or may include both A and B.

Herein, expressions including ordinal numbers, such as "first" and "second," etc., and/or the like, may modify various elements. However, such elements are not limited by the above expressions. For example, the above expressions do not limit the sequence and/or importance of the elements, are merely used for the purpose of distinguishing an element from the other elements. For example, a first user device and a second user device indicate different user devices although for both of them the first user device and the second user device are user devices. For example, a first element may be referred to as a second element, and similarly, a second element may be referred to as a first element without departing from the scope of the present disclosure.

When a component is referred to as being "connected" or "accessed" to other component, not only does the component directly connect or access the other component, but another component may also exist between the component and the other component. Meanwhile, when a component is referred to as being "directly connected" or "directly accessed" to other component, there is no component therebetween.

Herein, an electronic device may be a device including a communication function. For example, the electronic device may include one or more of the following: a smartphone, a tablet Personal Computer (PC), a mobile phone, a video phone, an e-book reader, a desktop PC, a laptop PC, a netbook computer, a Personal Digital Assistant (PDA), a Portable Multimedia Player (PMP), a Motion Picture Experts Group (MPEG) Audio Layer-3 MP3 player, a mobile medical device, a camera, or a wearable device. Examples wearable devices include a Head-Mounted-Device (HMD) (e.g., electronic eyeglasses), electronic clothing, an electronic bracelet, an electronic necklace, an electronic accessory, an electronic tattoo, a smart watch, etc.

In addition, an electronic device according to an embodiment of the present invention may be smart home appliances including a communication function. Smart home appliances may include one or more of. for example, a TeleVision (TV), a Digital Video Disk (DVD) player, an audio system, a refrigerator, an air-conditioner, a cleaning device, an oven, a microwave oven, a washing machine, an air cleaner, a set-top box, a TV box (e.g., Samsung HomeSync™, Apple TV™, or Google TV™), a game console, an electronic dictionary, an electronic key, a camcorder, an electronic album, etc.

An electronic device according to embodiments of the present invention may also be a medical device (e.g., a Magnetic Resonance Angiography (MRA) device, a Magnetic Resonance Imaging (MRI) device, a Computed Tomography (CT) device, a scanning machine, an ultrasonic wave device, etc.), a navigation device, a Global Positioning System (GPS) receiver, an Event Data Recorder (EDR), a Flight Data Recorder (FDR), a vehicle infotainment device, an electronic equipment for ships (e.g., navigation equipment, gyrocompass, etc.), avionics, a security device, a head unit for vehicle, an industrial or home robot, an Automatic Teller's Machine (ATM), a Point of Sales (POS) system, etc.

An electronic device according to embodiments of the present invention may be, for example, furniture or a portion of a building/structure, an electronic board, an electronic signature receiving device, a projector, various measuring instruments (e.g., a water meter, an electric meter, a gas meter and a wave meter), etc., which have a communication function, respectively. An electronic device according to various embodiments of the present invention may also be a combination of the components listed above. In addition, an electronic device according to various embodiments of the present invention may be a flexible device. An electronic device according to various embodiments of the present invention is not limited to the aforementioned devices.

Hereinafter, electronic devices according various embodiments are described in detail with reference to the accompanying drawings. In the following description, the term 'user' refers to a person or a device that uses an electronic device (e.g., an artificial intelligence electronic device).

Figure 1:
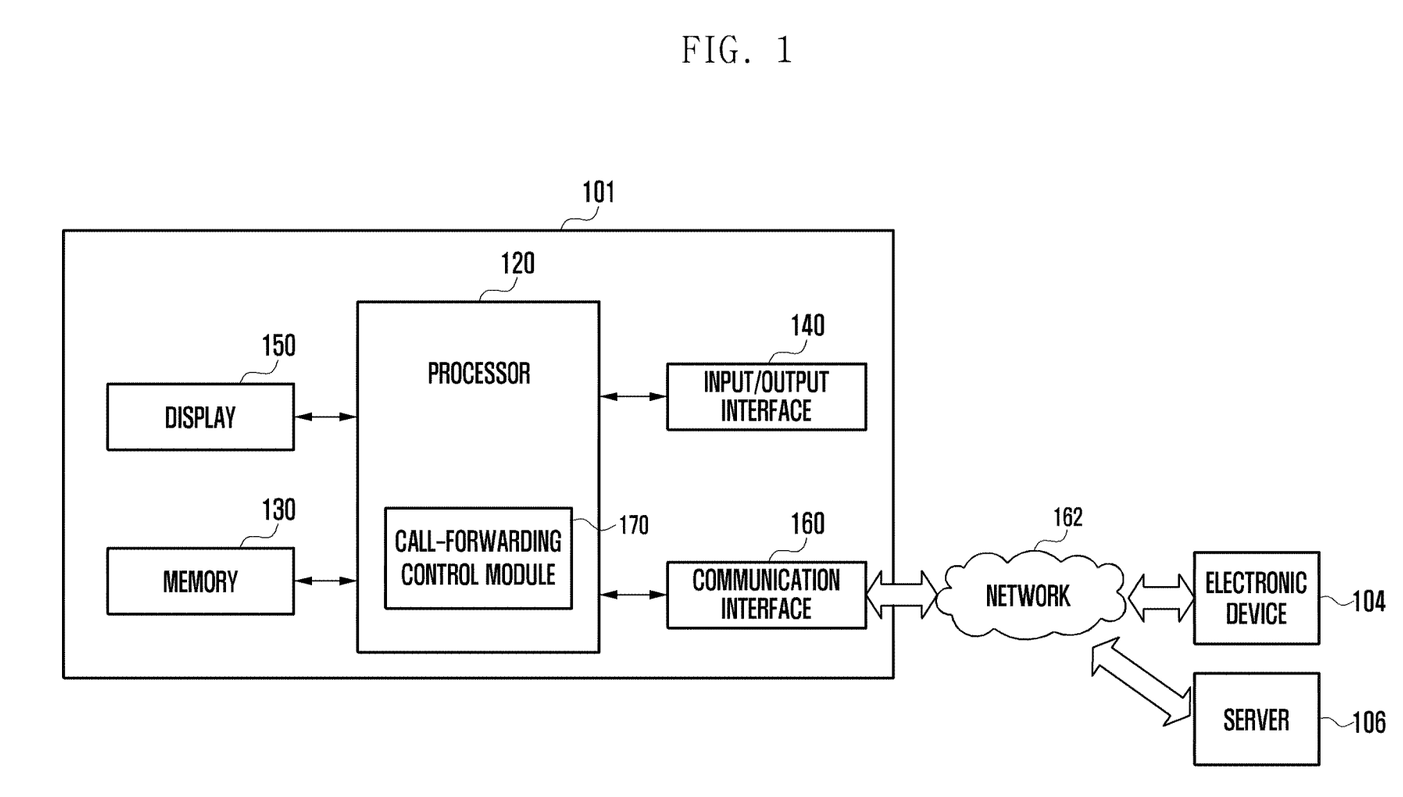
FIG. 1 is a block diagram illustrating a network environment including an electronic device according to an embodiment of the present invention.

FIG. 1 is a block diagram illustrating a network environment including an electronic device according to an embodiment of the present invention.

Referring to FIG. 1, an electronic device 101 includes a processor 120, a memory 130, an input/output interface 140, a display 150, and a communication interface 160.

The processor 120 receives instructions from, for example, the aforementioned components (e.g., the memory 130, the input/output interface 140, the display 150, the communication interface 160, etc.), decodes the received instructions, and performs operations and/or data processing according to the decoded instructions.

The memory 130 stores instructions or data received from or generated by the processor 120 or other components (e.g., the input/output interface 140, display 150, communication interface 160, etc.). The memory 130 may include one or more Subscriber Identity Module (SIM) cards.

The input/output interface 140 transfers instructions or data, which a user inputs through an input/output device (e.g., a sensor, keyboard, or touch screen) of the electronic device 101, to the processor 120, memory 130, or communication interface 160. For example, the input/output interface 140 may provide the processor 120 with data corresponding to a user's touch input through a touch screen. In addition, the input/output interface 140 may output instructions or data received from the processor 120, memory 130, or communication interface 160 to the input/output device (e.g., a speaker or a display). For example, the input/output interface 140 may output voice data processed by the processor 120 to a user through a speaker.

The display 150 displays various types of information (e.g., multimedia data, text data, etc.) viewable by the user. The display 150 may include a touch screen. The touch screen may detect a direct touch input by a user's hand or a touch pen and a hovering input.

The communication interface 160 establishes communication between the electronic device 101 and an external electronic device (e.g., the electronic device 104 or the server 106). For example, the communication interface 160 may be connected to the network 162 through wireless or wired communication and thereby communicate with the external device. The wireless communication may include Wireless Fidelity (Wi-Fi), BlueTooth (BT), Near Field Communication (NFC), Global Positioning System (GPS), and/or cellular communication (e.g., Long-Term Evolution (LTE), LTE-Advanced (LTE-A), Code Division Multiple Access (CDMA), Universal Mobile Telecommunication System (UMTS), Wireless BROadband (Wi-Bro), Global System for Mobile communications (GSM), etc.). The wired communication may include Universal Serial Bus (USB), High Definition Multimedia Interface (HDMI), Recommended Standard 232 (RS-232), and/or Plain Old Telephone Service (POTS).

According to an embodiment of the present invention, the network 162 is a telecommunications network. The telecommunications network may include a computer network, the Internet, the Internet of things, and/or a telephone network.

According to an embodiment of the present invention, the electronic device 101 includes a SIM card (e.g., in the memory 130 or as a separate component). The SIM card includes a SIM and may be fitted into a slot formed at a particular location in the electronic device 101. The SIM card includes unique identification information (e.g., Integrated Circuit Card IDentifier (ICCID)), or subscriber information (e.g., International Mobile Subscriber Identity (IMSI)). For example, the electronic device 101 may include first number information for identification in performing the communication function. Herein, number information for identification refers to information regarding a numeric form of identification used in performing communication. For example, the number information may be a telephone number used as a call address of a phone call. According to an embodiment of the present invention, the electronic device 101 includes a plurality of number information items for identification in performing a communication function.

The processor 120 includes a call-forwarding control module 170. According to an alternative embodiment of the present invention, the processor 120 may be functionally connected to the call-forwarding control module 170. The call-forwarding control module 170 processes at least some of the information obtained from the other components (e.g., the memory 130, input/output interface 140, communication interface 160, etc.) of the electronic device 101, and provides the processed information to the user in various modes. The call-forwarding control module 170 may transmit, to a server 106 or other electronic device having second number information (e.g., a different telephone number than the electronic device 101) (e.g., electronic device 104), a request for forwarding calls and/or messages, incoming to the other electronic device 104, to the electronic device 101.

The server 106 may be connected to the electronic device 101 and the other electronic device 104 through the network. When the server 106 receives a call-forwarding request from the electronic device 101, the server 106 remotely sets up the call-forwarding of the other electronic device 104. For example, when the electronic device 101 transmits a call-forwarding request including first number information to the server 106, the server 106 controls the call-forwarding setup for directing calls incoming to the other electronic device 104 to the first number (e.g., a telephone number of the electronic device 101).

The call-forwarding control module 170 may control the transmission of a call-forwarding request in response to a user's input. The call-forwarding control module 170 may control the transmission of a call-forwarding request based on a state in which short-range wireless communication has been established between the electronic device 101 and the other electronic device 104. For example, when short-range wireless communication connection between the electronic device 101 and the other electronic device 104 is disconnected, the electronic device 101 may automatically perform transmission of a call-forwarding request; or may output a call-forwarding control interface, receive a corresponding input through the call-forwarding control interface, and then perform transmission of the received call-forwarding request.

Figure 2:
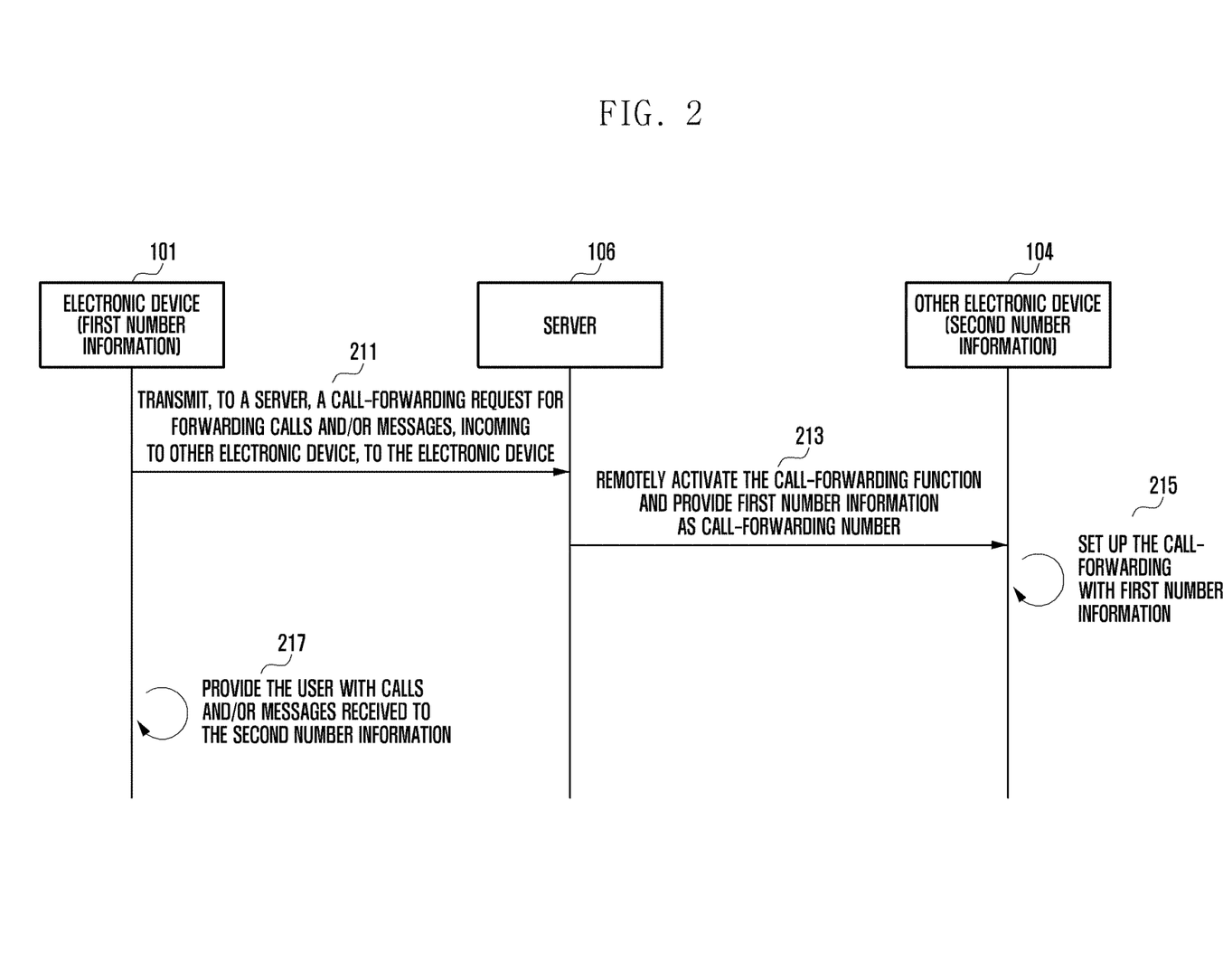
FIG. 2 is a flow diagram illustrating a method of controlling call-forwarding between electronic devices according to an embodiment of the present invention.

FIG. 2 is a flow diagram illustrating a method of controlling call-forwarding between electronic devices according to an embodiment of the present invention.

Although the embodiment of FIG. 2 refers to a method in which the setup of the call-forwarding between the electronic devices 101 and 104 is established by the server 106, the call-forwarding may also be set up as the electronic devices 101 and 104 directly transmit signals to each other in accordance with embodiments of the present invention.

Referring to FIG. 2, the electronic device 101 includes first number information and the other electronic device 104 includes second number information in order to identify these devices for a communication function.

According to an embodiment of the present invention, the electronic device 101 transmits, to a server 106, a request for forwarding calls and/or messages that are incoming to other electronic device 104, to the electronic device 101, in step 211. For example, the electronic device 101 may receive a user's input for executing the transmission of a call-forwarding request. In addition, when a short-range wireless communication connection between the electronic device 101 and other electronic device 104 is disconnected, the electronic device 101 may automatically or manually perform transmission of a call-forwarding request.

The server 106 remotely activates a call-forwarding function of the other electronic device 104, in step 213. The server 106 may provide first number information received from the electronic device 101 to the other electronic device 104. According to various embodiments of the present invention, each time that the server 106 receives a call-forwarding request from the electronic device 101, the server 106 provides a call-forwarding activation signal and the first number information to the other electronic device 104 or provides only a call-forwarding activation signal, without providing the number information, to the other electronic device 104.

The other electronic device 104 receives the call-forwarding activation signal from the server 106 and sets up the call-forwarding, in step 215. For example, when the other electronic device 104 receives the first number information, the other electronic device 104 sets up the call-forwarding with the first number information. However, when the other electronic device 104 does not receive number information, the other electronic device 104 may set up the call-forwarding with previously stored number. According to various embodiments of the present invention, the other electronic device 104 may perform, when a preset condition is satisfied, the call-forwarding setup, in consideration of security conditions. For example, the other electronic device 104 may set up the call-forwarding only when a user of the electronic device 101 requesting the call-forwarding is identical to the user of the other electronic device 104, the information about the electronic device 101 requesting the call-forwarding has been stored in or registered in the other electronic device 104 (e.g., the first number information has previously registered in the other electronic device 104), and/or the call-forwarding activation signal passes a security authentication procedure. When the other electronic device 104 receives the call-forwarding activation signal, the other electronic device 104 may request the subscription communication service company to direct the incoming calls to the first number information in the same ways as conventional call-forwarding setup methods.

When the call-forwarding of the other electronic device 104 has been successfully set up, the electronic device 101 provides the user with calls and/messages received based on the second number information of the other electronic device 104, in step 217. For example, the communication service company may forward calls and/or messages, received according to the second number information, to the electronic device of the requested, first number information (i.e., the electronic device 101). According to an embodiment of the present invention, it is assumed that the electronic device 101 and the other electronic device 104 are subscribed in the same communication service company. However, embodiments of the present invention are not limited to the embodiment, and the electronic devices 101 and 104 may be subscribed to different communication services in accordance with embodiments of the present invention.

When the user goes out (e.g., carrying only the electronic device 101 while leaving the other electronic device 104 behind, the user is able to easily control the call-forwarding of the other electronic device 104, so that calls and/or messages received according to the number of the other electronic device 104 can be forwarded to the electronic device 101.

The electronic devices 101 and 104 may be implemented with various types of devices with a communication function, such as wearable devices, smart phones, tablet PCs, etc.

Although the embodiment of FIG. 2 is described with reference to a method in which the electronic device 101 activates the call-forwarding of other electronic device 104 through the server 106, embodiments of the present invention may be modified such that the electronic device 101 directly provides a call-forwarding activation signal and the first number information to the other electronic device 104, in accordance with embodiments of the present invention.

Figure 3:
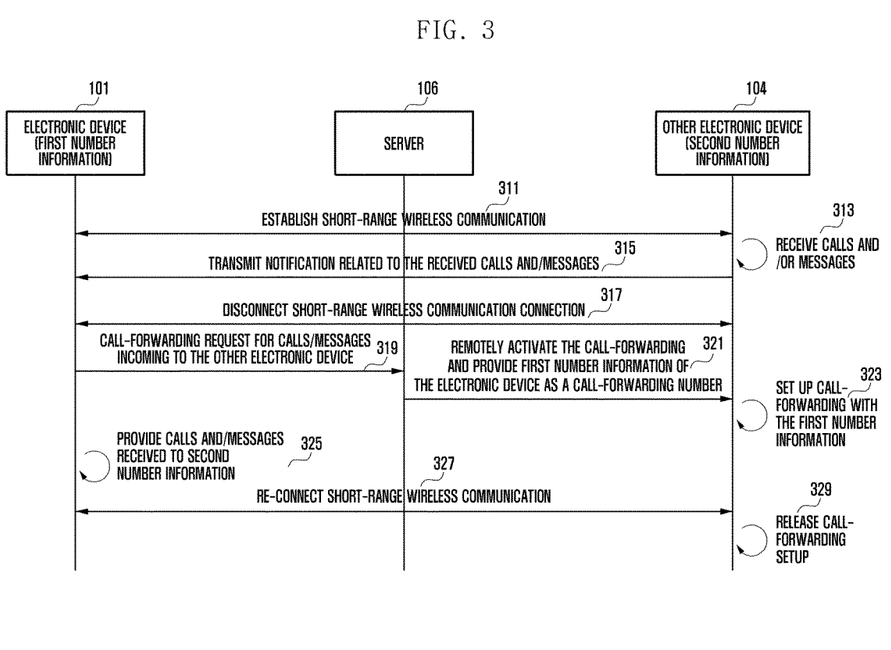
FIG. 3 is a flow diagram illustrating a method of controlling call-forwarding between electronic devices according to an embodiment of the present invention.

FIG. 3 is a flow diagram illustrating a method of controlling the call-forwarding between electronic devices according to an embodiment of the present invention.

Although the embodiment of FIG. 3 is described with reference to a method in which the setup of the call-forwarding between the electronic devices 101 and 104 is established by the server 106, the call-forwarding may also be set up such that the electronic devices 101 and 104 directly transmit signals to each other in accordance with embodiments of the present invention.

Referring to FIG. 3, the electronic device 101 includes first number information and the other electronic device 104 includes second number information for identifying the respective electronic devices when performing a communication function.

According to an embodiment of the present invention, the electronic device 101 and other electronic device 104 are connected to each other through short-range wireless communication, e.g., Wi-Fi, BT, NFC, or the like, in step 311. The electronic devices 101 and 104 are both located in a range available to the user.

The other electronic device 104 receives calls and/or messages, in step 313. The other electronic device 104, to which a second number corresponding to the second number information has been assigned, receives calls and/or messages through the second number information.

The other electronic device 104 transmits a notification related to the received calls and/or messages to the electronic device 101 through the short-range wireless communication, in step 315. The user can check the calls and/or messages, received by the other electronic device 104, by operating the electronic device 101. Although not shown, as the user assesses the notification provided by the electronic device 101, the user can allow the electronic device 101 to receive incoming calls and/or messages of the other electronic device 104 through short-range wireless communication. For example, when the electronic device 101 includes a wearable device, the user can easily check incoming calls and/or messages of the other electronic device 104 through the wearable device. According to the embodiment described with reference to FIG. 3, a notification related to incoming calls and/or messages incoming of the other electronic device 104 is transmitted to the electronic device 101 through the short-range wireless communication, the embodiment may be modified such that a notification related to incoming calls and/or messages of the electronic device 101 are also transmitted to the other electronic device 104 through the short-range wireless communication, in accordance with embodiments of the present invention.

The short-range wireless communication connection between the electronic device 101 and the other electronic device 104 is disconnected, in step 317. For example, when the user goes out (i.e., leaves a current location), carrying only the electronic device 101 while leaving the other electronic device 104 behind, the electronic device 101 may exit a range of short-range wireless communication with the other electronic device 104, and the short-range wireless communication connection between the electronic devices 101 and 104 is disconnected. Therefore, the electronic device 101 cannot be provided with the notification related to incoming calls and/or messages of the other electronic device 104 through the short-range wireless communication.

The electronic device 101 transmits, to a server 106, a request for forwarding incoming calls and/or messages of the other electronic device 104 to the electronic device 101, in step 319. According to an embodiment of the present invention, when short-range wireless communication connection between the electronic device 101 and the other electronic device 104 is disconnected, the electronic device 101 automatically performs transmission of a call-forwarding request.

Figure 4:
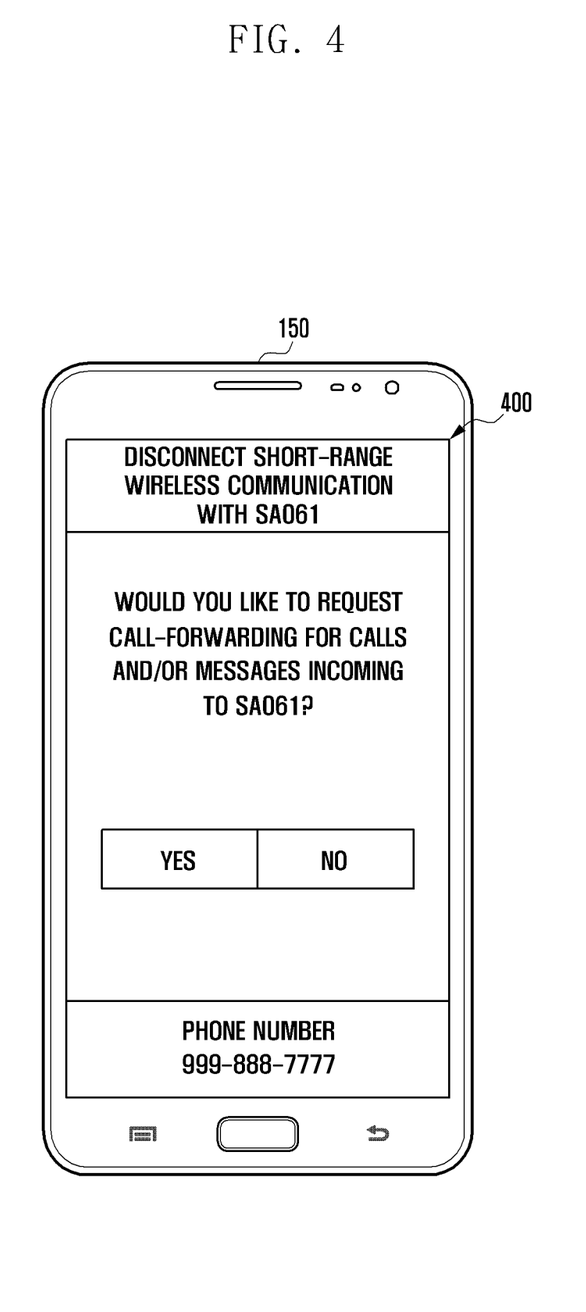
FIG. 4 is a diagram showing a screen of a call-forwarding control interface according to an embodiment of the present invention.

FIG. 4 is a diagram showing a screen of a call-forwarding control interface according to an embodiment of the present invention.

Referring to FIG. 4, according to an embodiment of the present invention, when short-range wireless communication connection between the electronic device 101 and the other electronic device 104 is disconnected, the electronic device 101 displays a call-forwarding control interface 400 on the display 150, receives a user's input through the interface 400, and then performs transmission of the call-forwarding request.

According to an embodiment of the present invention, the call-forwarding control interface 400 is provided to the electronic device 101 and/or the other electronic device 104. As shown in FIG. 4, the call-forwarding control interface 400 includes a user menu for a call-forwarding request. Although not shown, the user menu may include a call-forwarding request item for forwarding calls and/or forwarding messages. The call-forwarding control interface 400 may include the number information of the electronic device 101. For example, when the electronic device 101 includes an SIM card in which information about a plurality of numbers assigned to the electronic device 101 is stored, the user may select which number and/or numbers are included in the first number information of the electronic device 101 to be provided through the call-forwarding control interface 400.

Returning to FIG. 3, when the server 106 receives a call-forwarding request from the electronic device 101, the server 106 remotely activates call-forwarding of the other electronic device 104, in step 321. The server 106 provides the first number information, received from the electronic device 101, to the other electronic device 104. According to an embodiment of the present invention, each time the server 106 receives a call-forwarding request from the electronic device 101, the server 106 provides a call-forwarding activation signal and the first number information to the other electronic device 104, or provides only a call-forwarding activation signal, without providing the number information, to the other electronic device 104.

The other electronic device 104 receives the call-forwarding activation signal from the server 106 and sets up the call-forwarding, in step 323. For example, when the other electronic device 104 receives the first number information, the other electronic device 104 may set up the call-forwarding with the first number information. However, when the other electronic device 104 does not receive the first number information, the other electronic device 104 may set up the call-forwarding with a previously stored number. The other electronic device 104 may perform, when a preset condition is satisfied, the call-forwarding setup, in consideration of security conditions.

When the call-forwarding of the other electronic device 104 has been successfully set up, the electronic device 101 provides the user with calls and/messages received by the second number information, in step 325. Therefore, of the electronic device 101 and the other electronic device 104, when the user goes out, while carrying only the electronic device 101 and leaving the other electronic device 104 behind, which causes the disconnection of short-range wireless communication between the electronic device 101 and the other electronic device 104, the user is able to easily control the call-forwarding of the other electronic device 104, so that calls and/or messages, sent to the number of the other electronic device 104, can be forwarded to the electronic device 101.

The short-range wireless communication that has been disconnected between the electronic device 101 and the other electronic device 104 is re-connected, in step 327. For example, the electronic device 101 and the other electronic device 104 may be re-connected to each other through short range wireless communication when they are re-located within a range of short-range wireless communication of each other.

When the other electronic device 104 detects the re-connection of short-range wireless communication with the electronic device 101, the other electronic device 104 releases the setup of the call-forwarding to the electronic device 101, in 329. Accordingly, when the other electronic device 104 detects that the user may use the other electronic device 104 (due to the electronic device 101 being within a range of short range communications with the other electronic device 104), the other electronic device 104 automatically releases the call-forwarding setup.

Although, according to the method of FIG. 3, the electronic device 101 activates the call-forwarding of the other electronic device 104 through the server 106, the method may be modified such that the electronic device 101 directly provides a call-forwarding activation signal and the first number information to the other electronic device 104, in accordance with embodiments of the present invention.

Figure 5:
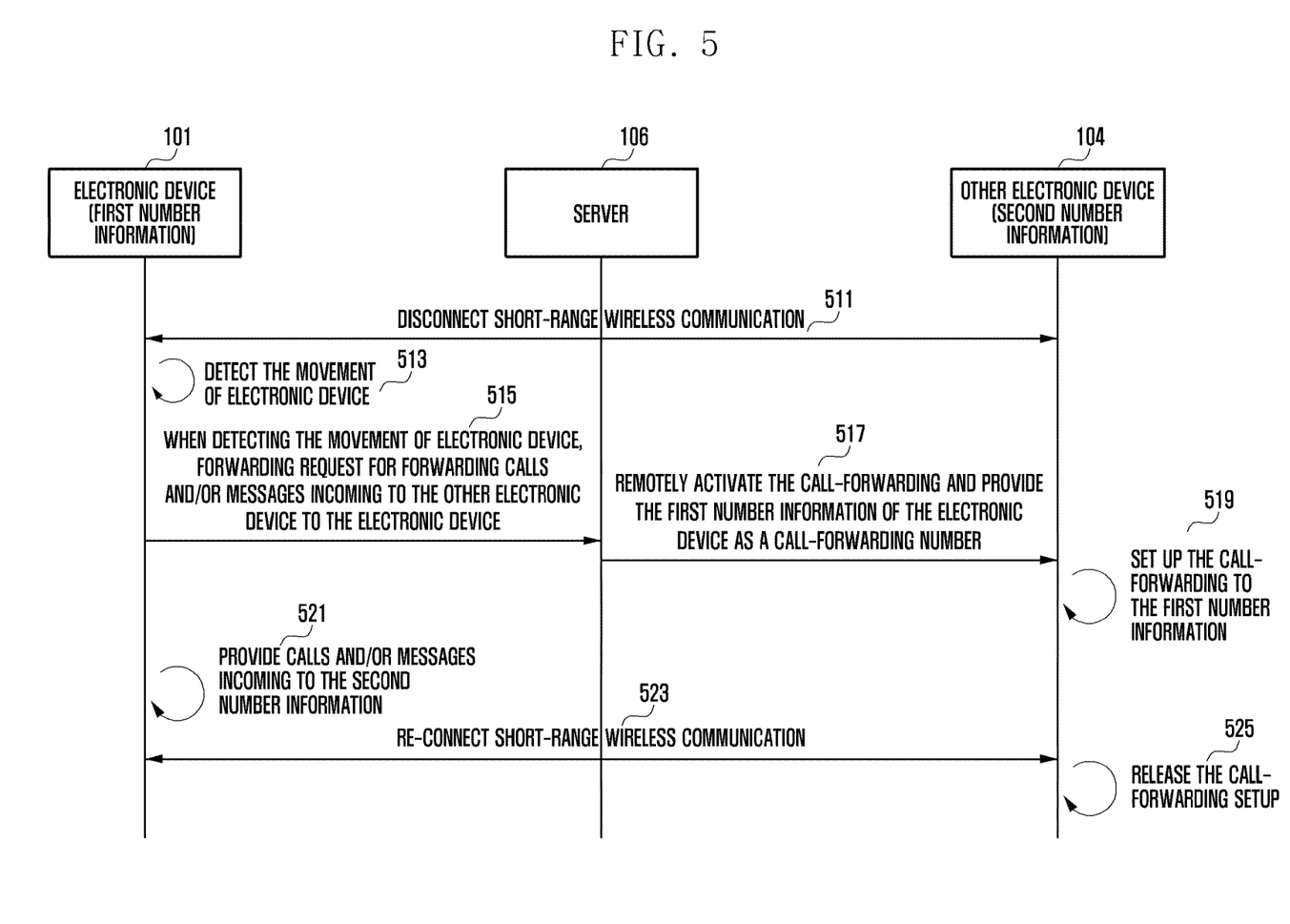
FIG. 5 is a flow diagram illustrating a method of controlling call-forwarding between electronic devices according to an embodiment of the present invention.

FIG. 5 is a flow diagram illustrating a method of controlling the call-forwarding between electronic devices 101 and 104 according to an embodiment of the present invention. Although, according to the method of FIG. 5, the setup of the call-forwarding between the electronic devices 101 and 104 is established by the server 106, the call-forwarding may also be set up such that the electronic devices 101 and 104 directly transmit signals to each other, in accordance with embodiments of the present invention. Referring to FIG. 5, in order to identify the electronic device 101 and the other electronic device 104 in performing a communication function, the electronic device 101 includes first number information and the other electronic device 104 includes second number information.

The short-range wireless communication connection between the electronic device 101 and the other electronic device 104 is disconnected, in step 511. For example, when the electronic device 101 and the other electronic device 104 are connected to each other through short-range wireless communication and the user goes out, carrying only the electronic device 101, the electronic device 101 may exit a range of short-range wireless communication with the other electronic device 104, and therefore, the short-range wireless communication connection between the electronic devices 101 and 104 is disconnected.

The electronic device 101 detects whether the electronic device 101 moves, in step 513. When the short-range wireless communication connection between the electronic device 101 and the other electronic device 104 is disconnected, the electronic device 101 and/or the other electronic device 104 may detect whether the electronic device 101 and/or the other electronic device 104 moves, in order to detect whether the user is carrying one or both of the electronic device 101 and the other electronic device 104.

In the example of FIG. 5, of the two devices, the movement of, for example, the electronic device 101 is detected. The movement of the electronic device 101 and/or the other electronic device 104 may be detected through Global Positioning System (GPS), a sensor, etc. Although it is not shown in FIG. 5, as another example, instead of detecting the movement of the electronic device 101, a sensor of the electronic device 101 may detects whether the user wears the electronic device 101, in accordance with embodiments of the present invention. When the user has worn the electronic device 101, the electronic device 101 may perform transmission of a request for forwarding incoming calls and/or messages of the other electronic device 104 to the electronic device 101. In addition, when both of the conditions are satisfied (i.e., the movement of the electronic device 101 is detected and the user has worn the electronic device 101), the electronic device 101 may perform transmission of a call-forwarding request for incoming calls and/or messages of the other electronic device 104.

When the movement of the electronic device 101 is detected, the electronic device 101 performs transmission of a call-forwarding request for incoming calls and/or messages of the other electronic device 104, in step 515. According to an embodiment of the present invention, when the short-range wireless communication connection with the other electronic device 104 is disconnected and the movement of the electronic device 101 is detected, the electronic device 101 may automatically perform transmission of the call-forwarding request. According to an embodiment of the present invention, when the short-range wireless communication connection between the electronic device 101 and the other electronic device 104 is disconnected and the movement of the electronic device 101 is detected, the electronic device 101 may display a call-forwarding control interface 400 on the display 150, receive a user's input through the interface 400, and then perform transmission of the call-forwarding request, as shown in FIG. 4.

Returning to FIG. 5, when the server 106 receives a call-forwarding request from the electronic device 101, the server 106 remotely activates a call-forwarding of the other electronic device 104, step 517. The server 106 may provide the first number information, received from the electronic device 101, to the other electronic device 104. According to an embodiment of the present invention, each time that the server 106 receives a call-forwarding request from the electronic device 101, the server 106 provides a call-forwarding activation signal and the first number information to the other electronic device 104, or provides only a call-forwarding activation signal, without providing the number information, to the other electronic device 104.

The other electronic device 104 receives the call-forwarding activation signal from the server 106 and sets up the call-forwarding in operation 519. For example, when the other electronic device 104 receives the first number information, the other electronic device 104 may set up the call-forwarding with the first number information. However, when the other electronic device 104 does not receive number information of the electronic device 101, the other electronic device may set up the call-forwarding with a previously stored number. The other electronic device 104 may perform, when a preset condition is satisfied, the call-forwarding setup, considering the security conditions.

According to an embodiment of the present invention, when the call-forwarding of the other electronic device 104 has been successfully set up, the electronic device 101 provides the user with calls and/messages received according to the second number information, in step 521. Therefore, of the electronic device 101 and the other electronic device 104, when the user goes out, carrying only the electronic device 101 without the other electronic device 106, which causes the disconnection of short-range wireless communication between the electronic device 101 and the other electronic device 104, the user is able to easily control the call-forwarding of the other electronic device 104, so that calls and/or messages, received to the number of the other electronic device 104, can be forwarded to the electronic device 101.

The short-range wireless communication that has been disconnected between the electronic device 101 and the other electronic device 104 are re-connected, in step 523. For example, when the electronic device 101 and the other electronic device 104 are re-located within a range of short-range wireless communication and the short-range wireless communication connection has also been established therebetween, the electronic device 101 and the other electronic device may be re-connected to each other through short-range wireless communication.

When the other electronic device 104 detects the re-connection of short-range wireless communication with the electronic device 101, the other electronic device 104 releases the call-forwarding setup to the electronic device 101, in step 525. Accordingly, when the other electronic device 104 detects that the user is able to use the other electronic device 104, the other electronic device 104 may automatically release the call-forwarding setup.

According to the method of FIG. 5, the electronic device 101 activates the call-forwarding of other electronic device 104 through the server 106, the electronic device 101 may directly provide a call-forwarding activation signal and the first number information to the other electronic device 104, in accordance with embodiments of the present invention.

Figure 6:
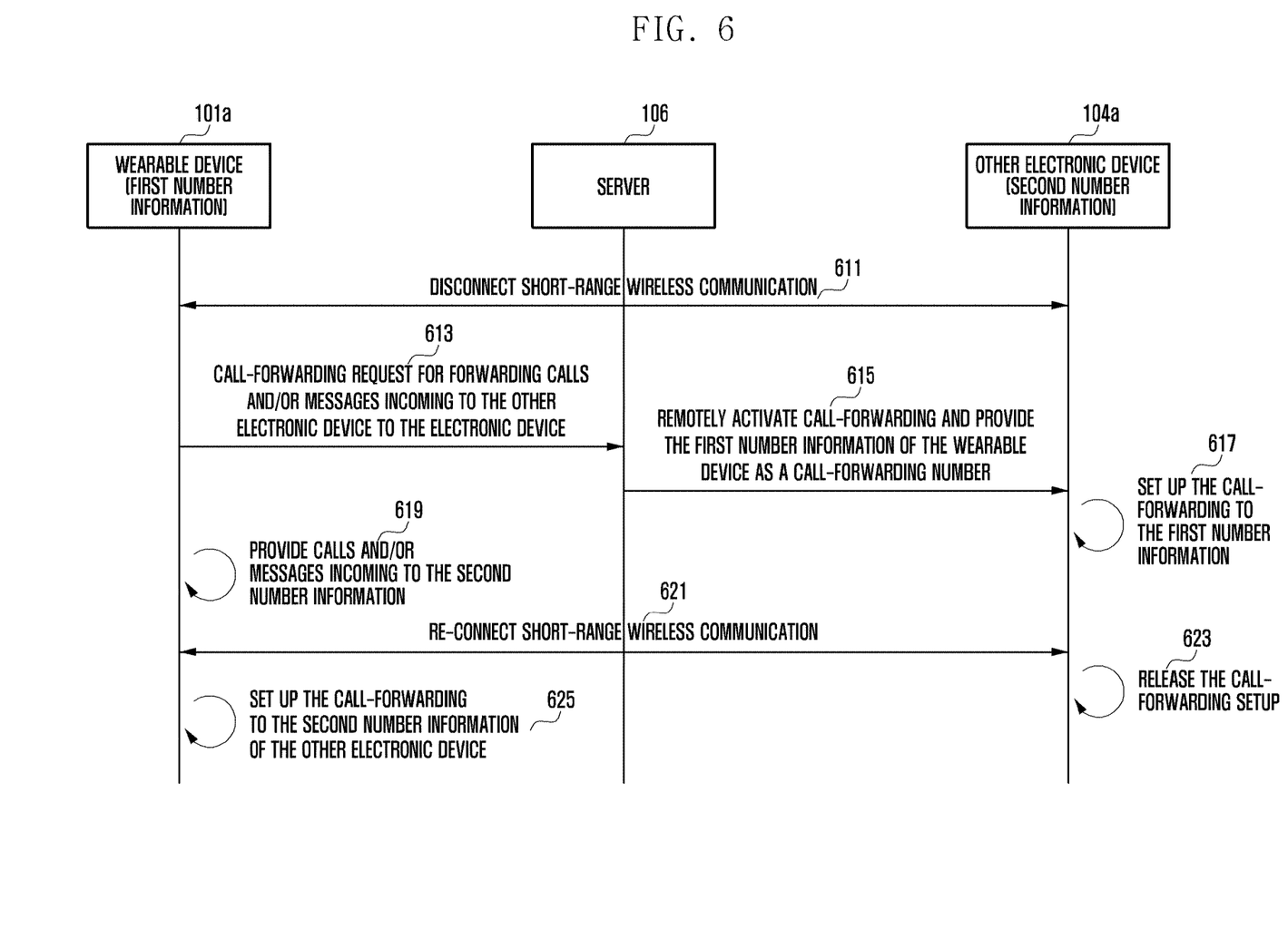
FIG. 6 is a flow diagram illustrating a method of controlling call-forwarding between electronic devices according to an embodiment of the present invention.

FIG. 6 is a flow diagram illustrating a method of controlling call-forwarding between electronic devices according to an embodiment of the present invention. More specifically, FIG. 6 is a flow diagram illustrating a method of controlling the call-forwarding between an electronic device 101 (e.g., a wearable device 101*a*) and the other electronic device 104 according to an embodiment of the present invention. Although, according to the method of FIG. 6, the setup of the call-forwarding between the wearable device 101*a* and the other electronic device 104 is established by the server 106, the call-forwarding may also be set up as the electronic devices 101*a* and 104 directly transmit signals, such as, setting parameters, etc., to each other, through short-range wireless communication, in accordance with embodiments of the present invention.

Referring to FIG. 6, the wearable device 101*a* may include first number information and the other electronic device 104 may include second number information, in order to identify these devices in performing a communication function.

The short-range wireless communication connection between the wearable device 101*a* and the other electronic device 104 are disconnected, in step 611. For example, when the wearable device 101*a* and the other electronic device 104 are connected to each other through short-range wireless communication and the user goes out, wearing only the wearable device 101*a* while leaving the other electronic device 104 behind, the wearable device 101*a* may exit a range of short-range wireless communication with the other electronic device 104, and the short-range wireless communication connection between the wearable device 101*a* and 104 may be disconnected.

The wearable device 101*a* transmits, to the server 106, a call-forwarding request for forwarding incoming calls and/or messages of the other electronic device 104, to the wearable device 101*a*, in step 613. For example, the wearable device 101*a* may receive a user's input for executing the transmission of a call-forwarding request. When the short-range wireless communication connection between the wearable device 101a and the other electronic device 104 is disconnected, the wearable device 101a may automatically or manually perform the transmission of a call-forwarding request. In addition, when the short-range wireless communication connection between the wearable device 101a and the other electronic device 104 is disconnected and the movement of the wearable device 101a is detected, the wearable device 101a may automatically or manually perform the transmission of a call-forwarding request.

When the server 106 receives a call-forwarding request from the wearable device 101a, the server 106 remotely activates the call-forwarding of the other electronic device 104, in step 615. The server 106 provides the first number information, which is received from the wearable device 101a, to the other electronic device 104. According to an embodiment of the present invention, each time the server 106 receives a call-forwarding request from the wearable device 101a, the server 106 provides a call-forwarding activation signal and the First number information to the other electronic device 104, or provides only a call-forwarding activation signal, without providing the number information, to the other electronic device 104.

The other electronic device 104 receives the call-forwarding activation signal from the server 106 and sets up the call-forwarding, in step 617. For example, when the other electronic device 104 receives the first number information, the other electronic device 104 sets up the call-forwarding with the first number information. However, when the other electronic device 104 does not receive number information, the other electronic device 104 sets up the call-forwarding with a previously stored number. The other electronic device 104 may perform, when a preset condition is satisfied, the call-forwarding setup, in consideration of security conditions.

When the call-forwarding of the other electronic device 104 has been successfully set up, the wearable device 101a provides the user with calls and/messages sent to the second number information of the other electronic device 14, in step 619. Therefore, when the user goes out and wears, from among the wearable device 101a and the other electronic device 104, only the wearable device 101a, the user is able to easily control the call-forwarding of the other electronic device 104 that the user is not carrying, so that calls and/or messages, transmitted to the number of the other electronic device 104, can be forwarded to the wearable device 101a.

The short-range wireless communication that has been previously disconnected between the wearable device 101a and the other electronic device 104 is re-connected, in step 621. For example, when the wearable device 101a and the other electronic device 104 are re-located within a range of short-range wireless communication and the short-range wireless communication connection has also been established therebetween, the electronic device 101 and the other electronic device 104 may be re-connected to each other through short-range wireless communication.

When the other electronic device 104 detects the re-connection of short-range wireless communication with the wearable device 101a, the other electronic device 104 releases the call-forwarding setup to the wearable device 101a, in step 623. Accordingly, when the other electronic device 104 detects that the user may use the other electronic device 104, the other electronic device 104 may automatically release the call-forwarding setup.

When the wearable device 101a detects the re-connection of short-range wireless communication, the wearable device 101a sets up the call-forwarding to the second number information of the other electronic device 104, in step 625. For example, when the other electronic device 104 has registered the same user or the second number information has registered, the wearable device 101a may set up the call-forwarding to the second number information in response to the re-connection of short-range wireless communication. When the user is in a state that the user can use both of the wearable device 101a (e.g., smart watch), and the other electronic device 104 (e.g., smartphone), since it is easier for the user to use the smartphone to check calls, messages, etc., the wearable device 101a may forward calls and/or messages to the other electronic device 104.

Although, according to the method of FIG. 6, the wearable device 101a activates the call-forwarding of other electronic device 104 through the server 106, according to an embodiment of the present invention, the wearable device 101a may directly provide a call-forwarding activation signal and the first number information to the other electronic device 104.

Figure 7A:
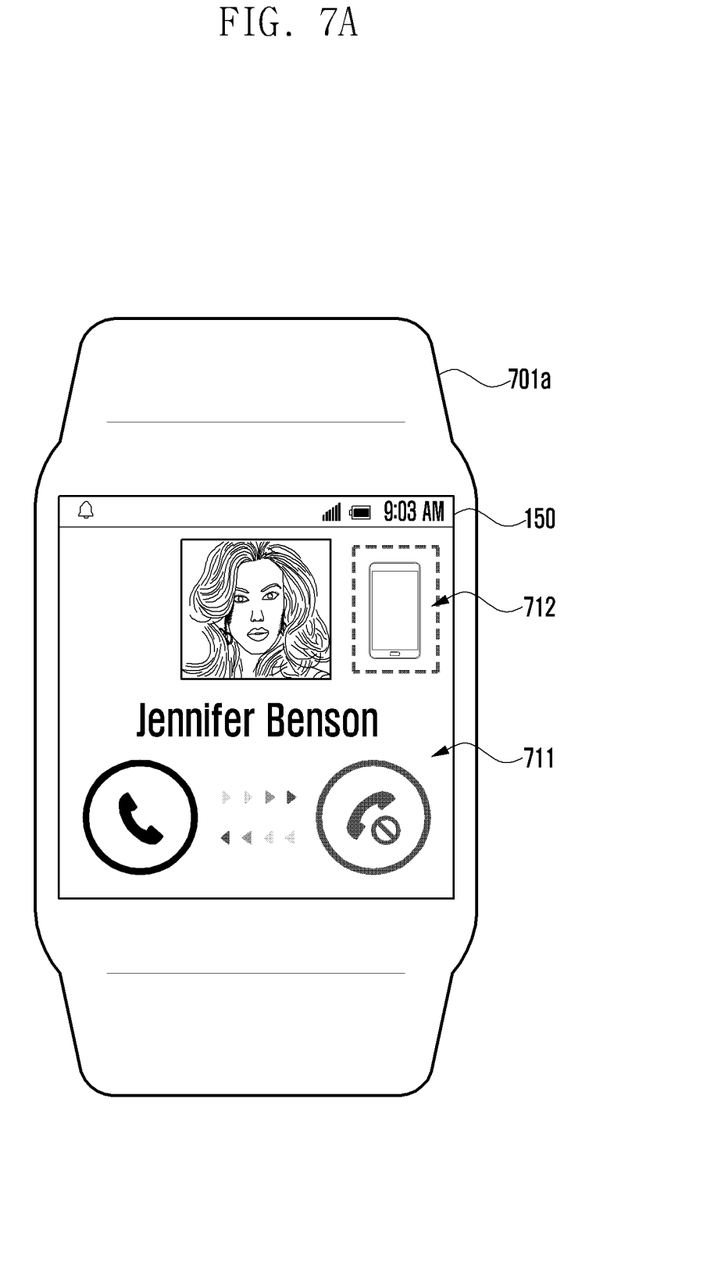
FIGS. 7A and 7B are diagrams showing call-forwarding screens of an electronic device according to an embodiment of the present invention.
Figure 7B:
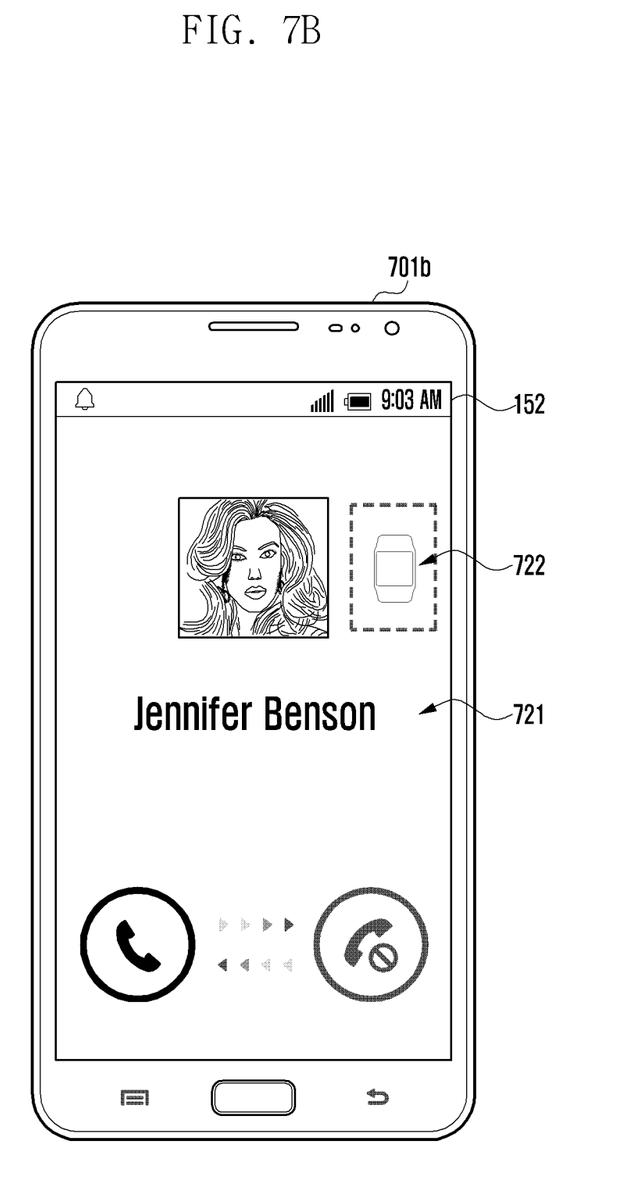

FIGS. 7A and 7B are diagrams showing call-forwarding screens of an electronic device according to an embodiment of the present invention.

Referring to FIG. 7A, according to an embodiment of the present invention, the electronic device 101 and the other electronic device 104 are a wearable device 701a and a smartphone, respectively. The wearable device 701a displays a call-forwarding setup on a screen on which an incoming call of the smartphone is forwarded to the wearable device 701a. The wearable device 701a provides an incoming call according to the second number information of the smartphone as an intended recipient, and displays a call reception interface 711 on a display 150. The call reception interface 711 includes a notification 712 indicating that a corresponding call is received and forwarded according to the second number information.

Referring to FIG. 7B, according to another embodiment of the present invention, the electronic device 101 and the other electronic device 104 are a smartphone 701b and a wearable device, respectively. The smartphone 701b displays a call-forwarding setup on a screen on which an incoming call of the wearable device is forwarded to the smartphone 701b. The smartphone 701b provides the incoming call according to the second number information of the wearable device as the intended recipient, and displays a call reception interface 721 on a display 152. The call reception interface 721 includes a notification 722 indicating that a corresponding call is being received and forwarded according to the second number information.

According to an embodiment of the present invention, call-forwarding can be controlled in such a way as to allow a user's electronic device to forward calls and/or messages incoming to another electronic device carried by the user.

According to an embodiment of the present invention, call-forwarding can be controlled in such a way that, when short-range wireless communication between electronic devices is disconnected, calls and/or messages incoming to one of the electronic devices are forwarded to another electronic device carried by the user.

According to an embodiment of the present invention, call-forwarding of a wearable device can be controlled according to whether short-range wireless communication is established between the wearable device and another electronic device.

Each of the above described elements of the electronic device according to various embodiments of the present invention may be formed by one or more components, and the names of the corresponding elements may vary according to the type of the electronic device. An electronic device according to various embodiments of the present invention may include at least one of the above described elements, and may exclude some of the above-described elements, and/or may further include other additional elements. Further, some of the elements of the electronic device according to various embodiments of the present invention may be coupled to form a single entity while performing the same functions as those of the corresponding uncoupled elements.

The term "module" as used herein with respect to various embodiments of the present invention, for example, may be defined as a unit including one of hardware, software, and firmware or any combination of two or more such units. The "module", for example, may be interchangeable with the term "unit", "logic", "logical block", "component", or "circuit". The term "module" may refer to the smallest unit of an integrated component or a part thereof. The term "module" may refer to the smallest unit that performs one or more functions or a part thereof. A module may be mechanically or electronically implemented. For example, a module, according to embodiments of the present invention, may include at least one of an Application-Specific Integrated Circuit (ASIC) chip, a Field-Programmable Gate Arrays (FPGA), and a programmable-logic device for performing certain operations, which are now known or will be developed in the future.

At least part of a method (e.g., operations) or system (e.g., modules or functions) according to various embodiments of the present invention can be implemented with instructions as programming modules that are stored in computer-readable storage media. One or more processors (e.g., the processor 120) can execute instructions, thereby performing the functions. An example of the computer-readable storage media may be the memory 130. At least part of the programming modules can be implemented (executed) by the processor 120. At least part of the programming module may include modules, programs, routines, sets of instructions or processes, etc., in order to perform one or more functions.

Examples of computer-readable media include magnetic media, such as hard disks, floppy disks, and magnetic tape; optical media such as Compact Disc Read Only Memory (CD-ROM) disks and Digital Versatile Disc (DVD); magneto-optical media, such as floptical disks; and hardware devices that are specially configured to store and perform program instructions (e.g., programming modules), such as Read-Only Memory (ROM), Random Access Memory (RAM), flash memory, etc. Examples of program instructions include machine code instructions created by assembly languages, such as a compiler, and code instructions created by a high-level programming language executable in computers using an interpreter, etc. The described hardware devices may be configured to act as one or more software modules in order to perform the operations and methods described above, or vice versa.

Modules or programming modules according to various embodiments of the present invention may include one or more components, with or without a portion of the above-described components, and may include new components. The operations performed by modules, programming modules, or the other components, according to various embodiments of the present invention, may be executed in serial, parallel, repetitive or heuristic fashion. A least some of the operations can be executed in any other order, skipped, or executed with additional operations.

The embodiments of the present invention described herein and in the accompanying drawings are merely provided to assist in a comprehensive understanding of the invention, and do not limit embodiments of the present invention. Although embodiments of the invention have been described in detail above, many variations and modifications of the basic inventive concept herein described, which may be apparent to those skilled in the art, will still fall within the spirit and scope of the embodiments of the invention as defined in the appended claims and their equivalents.

What is claimed is:

1. A method for controlling call-forwarding of a first electronic device corresponding to first call address information comprising:
   transmitting, to at least one of a server or a second electronic device corresponding to second call address information, a call-forwarding request to forward at least one of incoming calls or messages addressed to the second call address information of the second electronic device by the first electronic device;
   receiving the at least one of incoming calls or messages addressed to the second call address information based on the transmitted call-forwarding request when a short-range wireless communication connection between the first electronic device and the second electronic device is disconnected,
   wherein the first call address information is registered in the second electronic device.

2. The method of claim 1, wherein the first call address information is included in the call-forwarding request.

3. The method of claim 1, further comprising receiving, from the second electronic device through short-range wireless communication before transmitting the call-forwarding request, at least one of:
   a notification indicating that at least one of calls or messages addressed to the second call address information of the second electronic device is received by the second electronic device, or
   at least one of calls or messages received by the second electronic device.

4. The method of claim 1, wherein transmitting the call-forwarding request comprises:
   transmitting the call forwarding request when a short-range wireless communication connection between the first electronic device and the second electronic device is disconnected.

5. The method of claim 4, wherein transmitting the call-forwarding request further comprises:
   detecting, when the short-range wireless communication connection is disconnected, at least one whether the first electronic device is moving or whether the first electronic device is worn by a user; and
   transmitting based on a result of the detection, the call-forwarding request, at least one of automatically or in response to receipt of an input of the user.

6. The method of claim 4, further comprising:
   releasing a setup of the requested call-forwarding when the disconnected short-range wireless communication connection is re-connected.

7. The method of claim 1, wherein transmitting the call-forwarding request comprises:
   detecting at least one of whether the first electronic device is moving or whether the first electronic device is worn by a user; and
   based on the detection result, transmitting the call-forwarding request, automatically or by receiving an input of the user.

8. The method of claim 1, wherein receiving the at least one of the incoming calls or messages comprises:

receiving information indicating receipt of at least one of calls or messages addressed to the second call address information.

9. A first electronic device for controlling call-forwarding and corresponding to first call address information, the first electronic device comprising:
   a communication interface configured to connect to at least one of a server or a second electronic device corresponding to second call address information through a network;
   a short-range wireless communication interface configured to connect to the second electronic device through short-range wireless communication;
   a memory configured to store first call address information;
   a control module configured to:
   control at least one of the communication interface or the short-range wireless communication interface to transmit, to at least one of the server or the second electronic device, a call-forwarding request to forward at least one of incoming calls or messages addressed to the second call address information of the second electronic device by the first electronic device, and receiving the at least one of incoming calls or messages addressed to the second call address information based on the transmitted call-forwarding request when a short-range wireless communication connection between the first electronic device and the second electronic device is disconnected, and
   an input/output device for displaying the received at least one of calls or messages,
   wherein the first call address information is registered in the second electronic device.

10. The first electronic device of claim 9, wherein the first call address information is included in the call-forwarding request.

11. The first electronic device of claim 9, wherein the control module is further configured to control receipt of, from the second electronic device through the short-range wireless communication before transmitting the call-forwarding request, at least one of:
   a notification indicating that at least one of calls or messages addressed to the second call address information of the second electronic device is received by the second electronic device, or
   at least one of calls or messages received by the second electronic device.

12. The first electronic device of claim 9, wherein the control module is further configured to control the communication interface to transmit the call-forwarding request when a short-range wireless communication connection between the first electronic device and the second electronic device is disconnected.

13. The first electronic device of claim 12, wherein the control module is further configured to:
   detect, when the short-range wireless communication connection is disconnected, at least one of whether the first electronic device is moving or whether the first electronic device is worn by the user; and
   control at least one of the communication interface or the short-range wireless communication interface to transmit, based on a result of the detection, the call-forwarding request at least one of automatically or in response to receipt of an input of the user.

14. The first electronic device of claim 12, wherein the control module is further configured to release a setup of the requested call-forwarding when the disconnected short-range wireless communication is re-connected.

15. The first electronic device of claim 9, wherein the control module is further configured to:
   detect at least one of whether the first electronic device is moving or whether the first electronic device is worn by the user; and
   control at least one of the communication interface or the short-range wireless communication interface to transmit, based on the detection result, the call-forwarding request, at least one of automatically or in response to receipt of an input of the user.

16. The first electronic device of claim 9, wherein the control module is further configured to receive information indicating that at least one of calls or messages addressed to the second call address information.

17. A first electronic device for controlling call-forwarding and corresponding to first call address information, the first electronic device comprising:
   a communication interface configured to connect to at least one of a server or a second electronic device corresponding to second call address information through a network;
   a short-range wireless communication interface configured to connect to the second electronic device through short-range wireless communication;
   a memory configured to store the second call address information; and
   a control module configured to:
   control at least one of the communication interface or the short-range wireless communication interface to receive, from at least one of the server or the second electronic device, a call-forwarding activation signal for activating call-forwarding to the second electronic device and respond to the activation signal,
   set up the call-forwarding to the second electronic device, and
   determine, after receiving the call forwarding activation signal, whether the second call address information is registered in the memory.

18. The first electronic device of claim 17, wherein the control module is further configured to:
   set up, when the second call address information has registered in the memory, the call-forwarding to the second electronic device.

19. The first electronic device of claim 18, wherein the control module is further configured to control at least one of the communication interface or the short-range wireless communication interface to receive the call-forwarding activation signal, when a short-range wireless communication connection with the second electronic device is disconnected.

20. The first electronic device of claim 19, wherein the control module is further configured to release the call-forwarding setup when the disconnected short-range wireless communication connection is re-connected.

* * * * *